(12) United States Patent
Pang et al.

(10) Patent No.: US 10,327,001 B2
(45) Date of Patent: Jun. 18, 2019

(54) SYSTEMS AND METHODS FOR INTRA-BLOCK COPY

(71) Applicant: QUALCOMM Incorporated, San Diego, CA (US)

(72) Inventors: Chao Pang, San Diego, CA (US); Krishnakanth Rapaka, San Diego, CA (US); Xiang Li, San Diego, CA (US); Joel Sole Rojals, La Jolla, CA (US); Cheng-Teh Hsieh, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 737 days.

(21) Appl. No.: 14/743,176

(22) Filed: Jun. 18, 2015

(65) Prior Publication Data

US 2015/0373357 A1    Dec. 24, 2015

Related U.S. Application Data

(60) Provisional application No. 62/014,641, filed on Jun. 19, 2014, provisional application No. 62/154,399, filed on Apr. 29, 2015.

(51) Int. Cl.
*H04N 19/513* (2014.01)
*H04N 19/184* (2014.01)
(Continued)

(52) U.S. Cl.
CPC ......... *H04N 19/176* (2014.11); *H04N 19/105* (2014.11); *H04N 19/109* (2014.11);
(Continued)

(58) Field of Classification Search
CPC .. H04N 19/176; H04N 19/105; H04N 19/109; H04N 19/159; H04N 19/174; H04N 19/593
(Continued)

(56) References Cited

U.S. PATENT DOCUMENTS

2012/0207220 A1\* 8/2012 Kim ..................... H04N 19/46
375/240.16
2012/0213449 A1    8/2012 Samuelsson et al.
(Continued)

FOREIGN PATENT DOCUMENTS

| CN | 103747258 A | 4/2014 |
| CN | 103828364 A | 5/2014 |
| WO | 2013108691 A1 | 7/2013 |

OTHER PUBLICATIONS

Lee et al. ("AHG5: Block size restriction of intra block copy", Oct. 24, 2013), p. 1.\*
(Continued)

*Primary Examiner* — Christopher S Kelley
*Assistant Examiner* — Matthew K Kwan
(74) *Attorney, Agent, or Firm* — Kilpatrick Townsend & Stockton, LLP

(57) ABSTRACT

Techniques and systems are provided for encoding and decoding video data. For example, a method of encoding video data includes obtaining video data at an encoder, and determining to perform intra-picture prediction on the video data, using intra-block copy prediction, to generate the plurality of encoded video pictures. The method also includes performing the intra-picture prediction on the video data using the intra-block copy prediction, and, in response to determining to perform the intra-picture prediction on the video data using the intra-block copy prediction, disabling at least one of inter-picture bi-prediction or inter-picture uni-prediction for the plurality of encoded video pictures. The
(Continued)

method also includes generating the plurality of encoded video pictures based on the received video data according to the performed intra-block copy prediction.

19 Claims, 7 Drawing Sheets

(51) Int. Cl.
H04N 19/172 (2014.01)
H04N 19/503 (2014.01)
H04N 19/52 (2014.01)
H04N 19/176 (2014.01)
H04N 19/174 (2014.01)
H04N 19/105 (2014.01)
H04N 19/159 (2014.01)
H04N 19/593 (2014.01)
H04N 19/109 (2014.01)

(52) U.S. Cl.
CPC ......... *H04N 19/159* (2014.11); *H04N 19/174* (2014.11); *H04N 19/593* (2014.11)

(58) Field of Classification Search
USPC .................................................. 375/240.12
See application file for complete search history.

(56) References Cited

U.S. PATENT DOCUMENTS

| | | | |
|---|---|---|---|
| 2013/0202038 A1 | 8/2013 | Seregin et al. | |
| 2014/0072041 A1 | 3/2014 | Seregin et al. | |
| 2014/0355677 A1 | 12/2014 | Kondo | |
| 2015/0312588 A1* | 10/2015 | Yamamoto | H04N 19/105 375/240.15 |
| 2015/0373357 A1 | 12/2015 | Pang | |
| 2016/0277761 A1* | 9/2016 | Li | H04N 19/124 |

OTHER PUBLICATIONS

Zhou et al. ("Motion Vector Resolution Control for Screen Content Coding", Jan. 9, 2014), p. 1.*
Chuang T D., et al., "CE2-related: Intra Block Copy Searching Constraints for Reducing Worst Case Bandwidth", 21. JCT-VC meeting, Jun. 19, 2015-Jun. 26, 2015, Warsaw, (Joint Collaborative Team on Video Coding of ISO/IEC JTC1/SC29/WG11 and ITU-T SG.16), URL: http://wftp3.itu.int/AV-ARCH/JCTVC-SITE/, No. JCTVC-U0065, Jun. 10, 2015 (Jun. 10, 2015), XP030117486.
Rapaka K., et al., "CE2 :Test 5 on Intra Block Copy Constraints on Prediction", 21. JCT-VC meeting, Jun. 19, 2015-Jun. 26, 2015, Warsaw, (Joint Collaborative Team on Video Coding of ISO/IEC JTC1/SC29/WG11 and ITU-T SG.16) URL: http://wftp3.itu.int/AV-ARCH/JCTVC-SITE/, No. JCTVC-U0078, Jun. 10, 2015 (Jun. 10, 2015), XP030117502.
Laroche G., et al., "On Inter Modes Constraint for Slices", 21. JCT-VC Meeting; Jun. 19, 2015-Jun. 26, 2015; Warsaw, (Joint Collaborative Team on Video Coding of ISO/IEC JTC1/SC29/WG11 and ITU-T SG.16), URL: http://wftp3.1tu.int/av-arch/jctvc-site/, No. JCTVC-U0057, Jun. 9, 2015 (Jun. 9, 2015), XP030117477.
Ikai, T: "Bi-prediction restriction in small PU", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-TSG.16 ), Nov. 8, 2011, XP030110291, 5 pages.
International Search Report and Written Opinion—PCT/US2015/036609—ISA/EPO—Sep. 2, 2015.
Lee, S., et al., "AHG5: Block size restriction of intra block copy", 15, JCTVC Meeting; Oct. 23, 2013-Nov. 1, 2013; Geneva; (Joint Collaborative Team on Video Coding of ISO/IEC JTC1/SC29/WG11 and ITU-T SG.16), Oct. 24, 2013, XP030115095, 9 pages.
Dong, J., et al., "Adaptive Intra Prediction Padding to Improve Intra Motion Compensation", 25, Picture Coding Symposium: Apr. 24, 2006-Apr. 26, 2006, 4 pages.
Minezawa, A., et al., "AHG5/AHG8: Improvement of MV-HEVC-based RGB coding for screen contents", 15. JCT-VC Meeting; Oct. 23, 2013-Jan. 11, 2013; Geneva; (Joint Collaborative Team on Video Coding of ISO/IEC JTC1/SC29/WG11 and ITU-T SG.16), Oct. 26, 2013, XP030115069, 7 pages.
Pang, C., et al., "Non-SCCE1: Memory bandwidth reduction for Intra block copy", 18, JCT-VC Meeting; Jun. 30, 2014- Jul. 9, 2014; Sapporo; (Joint Collaborative Team on Video Coding of ISO/IEC JTC1/SC29/WG11 and ITU-T SG.16), Jun. 21, 2014, XP030116478, 9 pages.
Rosewarne, C., et al., "Non-RCE3: On Intra block copy", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16 ), Jan. 10, 2014, XP030115737, 4 pages.
Sharman, K., et al., "AHG5: Intra-block-copy in Non-4:4:4 Formats", 17, JCT-VC Meeting; Mar. 27, 2014-Apr. 4, 2014; Valencia; (Joint Collaborative Team on Video Coding of ISO/IEC JTC1/SC29/WG11 and ITU-T SG.16), Mar. 17, 2014, XP030115976, 5 pages.
Zhou, Y., et al., "Motion Vector Resolution Control for Screen Content Coding", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16 ), Jan. 9, 2014, XP030115825, 5 pages.
Pang, et al., "RCE3: Subtest B.3—Intra block copy with NxN PU," (Joint Collaborative Team on Video Coding of ISO/IEC JTC1/SC29/WG11 and ITU-T SG.16); 16th Meeting: San Jose; USA; Jan. 9-17, 2014, No. JCTVC-P0145, Jan. 15, 2014, 3 pp.

* cited by examiner

SYSTEMS AND METHODS FOR INTRA-BLOCK COPY

CROSS-REFERENCE TO RELATED APPLICATIONS

This application claims the benefit of U.S. Provisional Application No. 62/014,641, filed Jun. 19, 2014, and U.S. Provisional Application No. 62/154,399, filed Apr. 29, 2015, both of which are hereby incorporated by reference, in their entirety. This application is related to U.S. application Ser. No. 14/743,253 , titled "SYSTEMS AND METHODS FOR INTRA-BLOCK COPY," filed on the same date herewith, which is hereby incorporated herein by reference, in its entirety.

FIELD

The present disclosure generally relates to video coding, and more specifically to techniques and systems for intra-block copy.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some embodiments, techniques and systems are described for performing intra-block copy. In some examples, certain restrictions may be placed on one or more prediction techniques when intra-block copy prediction is enabled. For example, the one or more prediction techniques may be disabled when an intra-block copy prediction technique is performed. In another example, the one or more prediction techniques may be disabled when a prediction block size is less than or equal to a block size. Other examples are described herein for controlling the use of prediction techniques.

In some embodiments, techniques and systems are described for selectively determining a reference block to use for an intra-block copy prediction technique. For example, techniques for selecting a reference block to use when performing intra-block copy prediction may make a determination to exclude blocks that are encoded using bi-prediction from blocks that are considered for use in the intra-block copy prediction. Other examples are described herein for selectively determining a reference block to use when performing intra-block copy prediction.

By performing the intra-block copy techniques according to the various aspects and features discussed herein, memory bandwidth and/or size requirements are reduced.

One inventive aspect is a method of encoding video data to generate a plurality of encoded video pictures. The method includes obtaining video data at an encoder, and determining to perform intra-picture prediction on the video data, using intra-block copy prediction, to generate the plurality of encoded video pictures. The method also includes performing the intra-picture prediction on the video data using the intra-block copy prediction, and, in response to determining to perform the intra-picture prediction on the video data using the intra-block copy prediction, disabling at least one of inter-picture bi-prediction or inter-picture uni-prediction for the plurality of encoded video pictures. The method also includes generating the plurality of encoded video pictures based on the received video data according to the performed intra-block copy prediction.

Another inventive aspect is an apparatus for encoding video data. The apparatus includes a memory configured to store video data, and a processor configured to obtain the video data, determine to perform intra-picture prediction on the video data, using intra-block copy prediction, to generate a plurality of encoded video pictures, and perform the intra-picture prediction on the video data using the intra-block copy prediction. The processor is also configured to, in response to determining to perform the intra-picture prediction on the video data using the intra-block copy prediction, disable at least one of inter-picture bi-prediction or inter-picture uni-prediction for the plurality of encoded video pictures. The processor is also configured to generate the plurality of encoded video pictures based on the video data according to the performed intra-block copy prediction.

Another inventive aspect is a computer readable medium of an encoder having stored thereon instructions that when executed by a processor cause the processor to perform a method of encoding video data to generate a plurality of encoded video pictures. The method includes obtaining video data, determining to perform intra-picture prediction on the video data, using intra-block copy prediction, to generate the plurality of encoded video pictures, and performing the intra-picture prediction on the video data using the intra-block copy prediction. The method also includes, in response to determining to perform the intra-picture prediction on the video data using the intra-block copy prediction, disabling at least one of the inter-picture bi-prediction or the inter-picture uni-prediction for the plurality of encoded video pictures. The method also includes generating the plurality of encoded video pictures based on the video data according to the performed intra-block copy prediction.

Another inventive aspect is a method of decoding video data to generate a plurality of decoded video pictures. The method includes receiving, in a video bitstream, encoded video data encoded using a plurality of selectable prediction modes. The plurality of prediction modes include an inter-picture uni-prediction mode, an inter-picture bi-prediction mode, and an intra-picture intra-block copy mode. The method also includes receiving, in the video bitstream, an indication that inter-picture bi-prediction is disabled for a portion of the encoded video data. The method also includes determining, based on the indication, a prediction mode from the plurality of prediction modes for predicting a prediction unit of the portion of encoded video data, and decoding the prediction unit of the portion of encoded video data according to the determined prediction mode.

Another inventive aspect is an apparatus for decoding video data. The apparatus includes a memory configured to store encoded video data received in a video bitstream and encoded with a plurality of prediction modes. The plurality of prediction modes include an inter-picture uni-prediction mode, an inter-picture bi-prediction mode, and an intra-picture intra-block copy mode. The apparatus further includes a processor configured to obtain the encoded video data from the memory, and receive, in the video bitstream, an indication that inter-picture bi-prediction is disabled for a portion of the encoded video data. The processor is also configured to determine, based on the indication, a prediction mode from the plurality of prediction modes for predicting a prediction unit of the portion of encoded video data. The processor is also configured to decode the prediction unit of the portion of encoded video data according to the determined prediction mode.

Another inventive aspect is a computer readable medium of a decoder having stored thereon instructions that when executed by a processor cause the processor to perform a method of decoding video data to generate a plurality of decoded video pictures. The method includes receiving, in a video bitstream, encoded video encoded using a plurality of prediction modes. The plurality of prediction modes include an inter-picture uni-prediction mode, an inter-picture bi-prediction mode, and an intra-picture intra-block copy mode. The method also includes receiving, in the video bitstream, an indication that inter-picture bi-prediction is disabled for a portion of the encoded video data, determining, based on the indication, a prediction mode from the plurality of prediction modes for predicting a prediction unit of the portion of encoded video data, and decoding the prediction unit of the portion of encoded video data according to the determined prediction mode.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION OF THE PREFERRED EMBODIMENT

Figure 1:
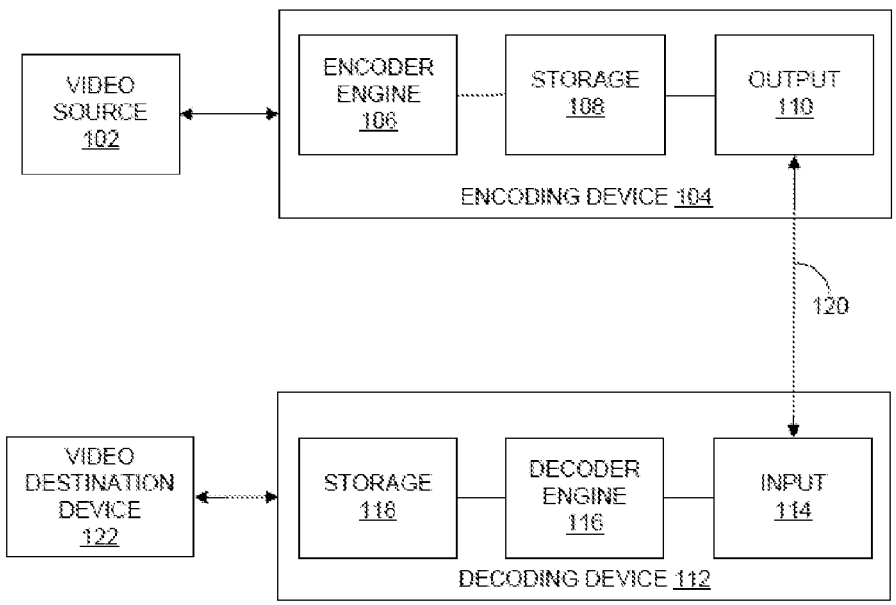
FIG. 1 is a block diagram illustrating an example of an encoding device and a decoding device, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Several systems and methods of video coding using video encoders and decoders are described herein. For example, one or more systems and methods are directed to handling of unavailable layers, layer sets, and operation points, as well as restrictions on representation format parameters in multi-layer video coding.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

FIG. 1 is a block diagram illustrating an example of a system 100 including an encoding device 104 and a decoding device 112. Encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol. An HEVC draft specification is available from http://phenix.it-sudparis.eu/jct/doc_end_user/documents/17_Valencia/wg11/JCTVC-Q1003-v1.zip. A working draft of MV-HEVC is available from http://phenix.it-sudparis.eu/jct2/doc_end_user/documents/8_Valencia/wg11/JCT3V-H1002-v5.zip. A working draft of SHVC is available from http://phenix.it-sudparis.eu/jct/doc_end_user/documents/17_Valencia/wg11/JCTVC-Q1008-v2.zip.

Many embodiments described herein describe examples using the HEVC standard, or extensions thereof. However, the techniques and systems described herein may also be applicable to other coding standards, such as AVC, MPEG, extensions thereof, or other suitable coding standards. Accordingly, while the techniques and systems described herein may be described with reference to a particular video coding standard, one of ordinary skill in the art will appreciate that the description should not be interpreted to apply only to that particular standard.

A video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. An HEVC bitstream, for example, may include a sequence of data units called network abstraction layer (NAL) units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to multiple coded pictures. A coded picture and non-VCL NAL units (if any) corresponding to the coded picture is called an access unit (AU).

NAL units may contain a sequence of bits forming a coded representation of the video data, such as coded representations of pictures in a video. The encoder engine 106 generates the coded representation by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signaled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and is square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a plan surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level.

Inter-prediction using uni-prediction, each prediction block uses at most one motion compensated prediction signal, and generates P prediction units. Inter-prediction using bi-prediction, each prediction block each prediction block uses at most two motion compensated prediction signals, and generates B prediction units.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoder 104 may then perform transformation and quantization. For example, following prediction, the encoder engine 106 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compressing by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded bitstream includes quantized transform coefficients, prediction information (e.g., prediction modes, motion vectors, or the like), partitioning information, and any other suitable data, such as other syntax data. The different elements of the coded bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a one-dimensional vector, the encoder engine 106 may entropy encode the one-dimensional vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units. A sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). The goal of the parameter sets is bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence or bitstream. A coded video sequence is a series of access units that starts with a random access point picture (e.g., an instantaneous decode reference (IDR) picture or broken link access (BLA) picture, or other appropriate random access point picture) and includes all access units up to but not including the next random access point picture (or the end of the bitstream). The information in an SPS does not typically change from picture to picture within a coded video sequence. All pictures in a coded video sequence use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

The output 110 of the encoding device 104 may send the NAL units making up the encoded video data over the communications link 120 to the decoding device 112 of the receiving device. The input 114 of the decoding device 112 may receive the NAL units. The communications link 120 may include a signal transmitted using a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the output 110. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 receives the encoded video data and may provide the video data to the decoder engine 116 or to storage 118 for later use by the decoder engine 116. The decoder engine 116 may decode the encoded video data by entropy decoding (e.g., using an entropy decoder) and extracting the elements of the coded video sequence making up the encoded video data. The decoder engine 116 may then rescale and perform an inverse transform on the encoded video data. Residues are then passed to a prediction stage of the decoder engine 116. The decoder engine 116 then predicts a block of pixels (e.g., a PU). In some examples, the prediction is added to the output of the inverse transform.

The decoding device 112 may output the decoded video to a video destination device 112, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example having specific details of the encoding device 104 is described below with reference to FIG. 8. An example having specific details of the decoding device 112 is described below with reference to FIG. 9.

As noted above, extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, ... n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

As previously described, various prediction modes may be used in a video coding process, including intra-prediction. One form of intra-prediction includes intra-block copy. The intra-block copy was included in the HEVC range extension working draft text (JCTVC-P1005). Using redundancy in an image frame or picture, intra-block copy performs block matching to predict a block of samples (e.g., a CU, a PU, or other coding block) as a displacement from a reconstructed block of samples in a neighboring region of the image frame. By removing the redundancy from repeating patterns of content, the intra-block copy prediction improves coding efficiency.

Techniques and systems described herein relate to improving memory bandwidth efficiency, limiting worst case memory accesses, and other aspects of intra-block copy. The aspects and methods in this document are applicable to HEVC and its extensions, such as screen content coding, or other extensions. For example, coding tools may be implemented for coding screen-content material, such as text and graphics with motion. Further, technologies may be provided that improve the coding efficiency for screen content. Significant improvements in coding efficiency can be obtained by exploiting the characteristics of screen content with various coding tools. For example, some aspects support of possibly high bit depth (more than 8 bit), high chroma sampling format (including 4:4:4 and 4:2:2), and other improvements.

Figure 2:
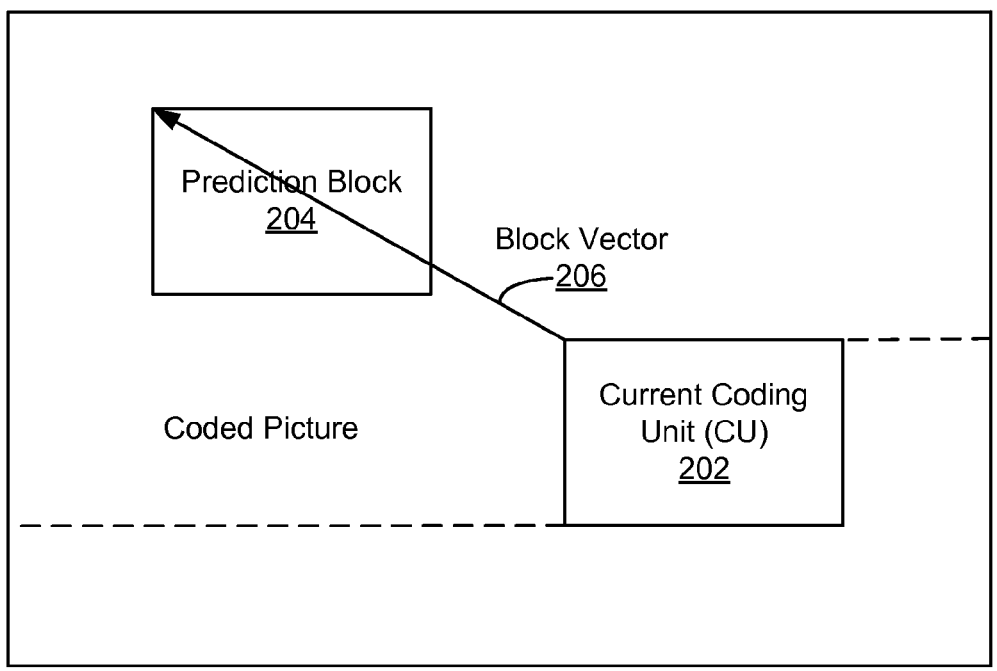
FIG. 2 is a block diagram illustrating an intra-block copy process.

The intra-block copy tool described herein enables spatial prediction from non-neighboring samples but within the current picture. For example, FIG. 2 illustrates a coded picture 200 in which intra-block copy is used to predict a current coding unit 202. The current coding unit 202 is predicted from already decoded prediction block 204 (before in-loop filtering) of the coded picture 200 using the block vector 206. In-loop filtering may include both in-loop deblocking filter and Sample Adaptive Offset (SAO). In the decoder, the predicted values are added to the residues without any interpolation. For example, the block vector 206 may be signaled as an integer value. After block vector prediction, the block vector difference is encoded using a motion vector difference coding method, such as that specified in the HEVC standard. Intra-block copy is enabled at both CU and PU level. For PU level intra-block copy, 2N×N and N×2N PU partition is supported for all the CU sizes. In addition, when the CU is the smallest CU, N×N PU partition is supported.

Contrary to traditional intra-prediction modes, intra-block copy (IBC) allows spatial prediction from non-neighboring samples. These non-neighboring samples could be from any of the already decoded samples (before in-loop filtering) within the same picture and signaled by a block vector. Memory accesses of these non-neighboring samples increase the overall memory bandwidth when IBC is used. For example, increased read access is caused, at least in part, by fetching of spatial prediction samples (that are not in cache/local memory). It may be noted that in traditional intra mode, the neighboring samples used are only 1 row of above samples and 1 column of left samples and are possible to be placed into the cache. In contrast, when IBC is used, all previously encoded/decoded samples may be used as a reference unit. In order to support the increased number of available samples, the system supports additional memory usage. Increased write access is caused due, in part, to the storage of both unfiltered samples for IBC spatial prediction, and filtered reconstructed samples for output/temporal prediction for future pictures.

The HEVC standard defines a worst case bandwidth requirement. The increased bandwidth described above may, in some cases, be greater than HEVC worst case bandwidth requirement. The increased bandwidth poses a burden on implementation of IBC techniques, and may make it difficult to re-purpose an HEVC core to support screen content extensions or an HEVC extension that supports IBC.

Figure 3:
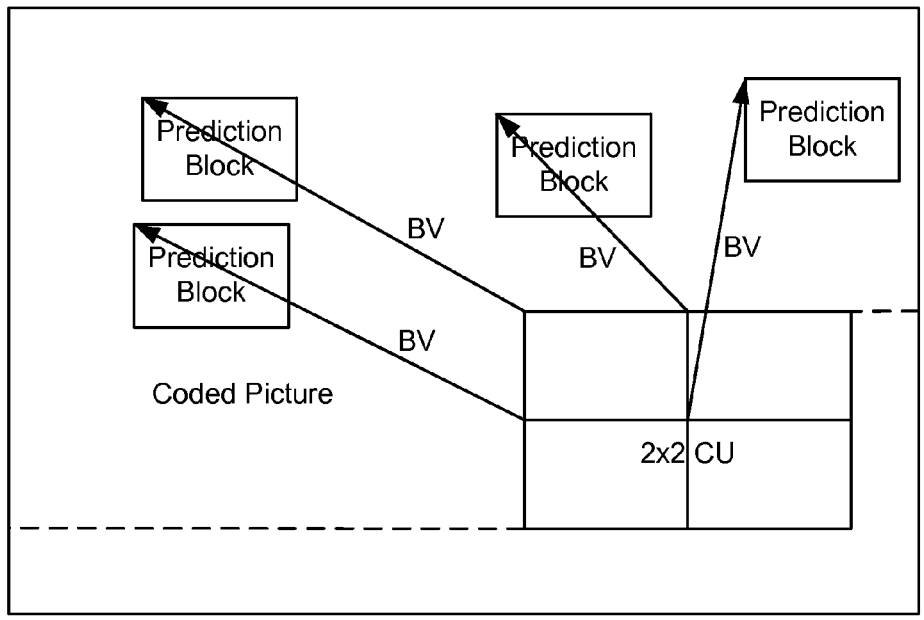
FIG. 3 is a block diagram illustrating an intra-block copy process with dispersed block vectors.

Furthermore, large search ranges used in IBC may lead to disperse block vector distributions resulting in bandwidth and performance system loads that could make it extremely difficult to implement. As shown in the example in FIG. 3, it is possible that the distribution of IBC block vectors with a CU could be dispersed. Potentially this could lead to the need of fetching the samples from external memory (DDR) as all the prediction samples may not be available in the cache. To fit all the prediction blocks within the cache area requires the system to have extremely large cache, which is expensive and not feasible in low power designs. This drastically affects the system bandwidth, performance and cost. Such block vector distributions are more probable as the search range increases.

Figure 4:
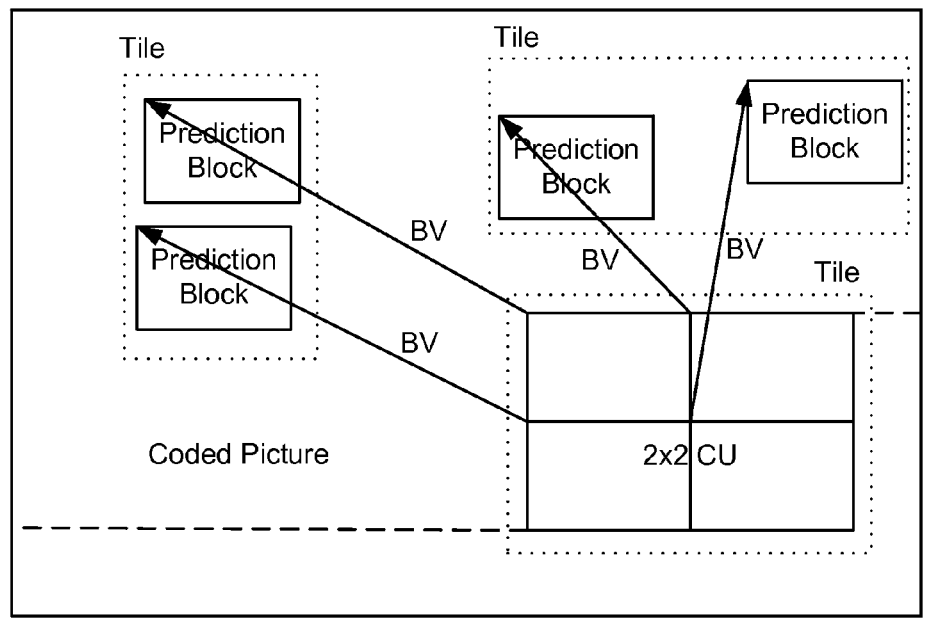
FIG. 4 is a block diagram illustrating an intra-block copy process with block vectors dispersed over multiple tiles.

The large search range could lead to block vectors distributions across tiles resulting in severe performance impact on parallelization. As shown in the example in FIG. 4, it is possible that the distribution of IBC block vectors with a CU could be dispersed across multiple tiles.

For Low delay P coding, it is asserted that worst case number of block and/or motion vectors with existing IBC design could be higher than the worst case number of motion vectors of HEVC (for a CU, a CTB, or other coding unit or block). This is due to supporting N×N for the smallest CU size. The high number of block and/or motion vectors imposes additional burden on the possible number of loads.

Line-based IBC includes partitions with finer granularity than traditional IBC, including partitions as small as a line. Line-based IBC may increase the number of motion vectors larger than the existing HEVC design. Higher motion vectors would results in increased sample fetching thereby increasing the bandwidth.

Using slices may help significantly for error resiliency. An intra slice may be self-contained and decodable in stand-alone. However, IBC might introduce dependency of an I-slice with respect to another slice impacting its error resilience capability.

Various aspects of intra-block copy are discussed herein, in view of the above shortcomings in addition to others. Each of the discussed features can work separately or jointly with one or more other solutions. The discussed methods, systems, and aspects applies to IBC, but can also be applied to other coding tools, for example, with high bandwidth and cache requirements, such as, for example, 1-D dictionary, palette, or other coding tools.

Bi-prediction Restriction when IBC is Enabled

In HEVC, 8×8 pixel block bi-prediction represents the worst case bandwidth requirement. It is beneficial if the all the HEVC extensions also follow the same worst case bandwidth requirement. Hence, to reduce the memory read accesses and to keep the bandwidth within the limits of HEVC worst case requirements, restrictions to bi-prediction when IBC is enabled are discussed below.

In some embodiments, as a consequence of IBC being enabled, the inter-frame bi-prediction is disabled. For example, in response to a state corresponding to intra-frame prediction with IBC, inter-frame bi-prediction may be disabled. As a result, with IBC, demand on system resources, such as memory bandwidth, is effectively reduced from inter-frame bi-prediction to intra-frame prediction.

In some embodiments, one or more additional conditions may be required to disable inter-frame bi-prediction. Because smaller prediction blocks require more system resources, such as memory bandwidth, than large prediction blocks, prediction block size may be an additional requirement for disabling inter-frame bi-prediction. For example, in some embodiments, as a consequence of IBC being enabled and also the prediction block size being less than or equal to a predefined size, the inter-frame bi-prediction is disabled. The predefined size may, for example, be 4×4 pixels, 4×8 pixels, 8×4 pixels, 8×8 pixels, 8×16 pixels, 16×16 pixels, 32×32 pixels, or another size.

In some embodiments, a flag can be used to specify or indicate if bi-prediction is to be disabled or not as a consequence of IBC being enabled. In some embodiments, the flag indicates whether the restriction on bi-prediction is applied, for example, at any of various data construct levels. For example, the flag may indicate that the restriction is applied to one or more sequences, pictures, slices, or other data units. The flag may be signaled at one or more of the following parameter sets: VPS, SPS, PPS, video usability information (VUI), slice header or their respective extensions.

In some embodiments, the following, or equivalent, sequence parameter set raw byte sequence payload (RBSP) syntax is used. In this embodiment, the bi-prediction is disabled as a consequence of the prediction block size being less than or equal to 8×8 (e.g., based on JCTVC-P1005_v4).

| seq_parameter_set_rbsp( ) { | Descriptor |
|---|---|
| sps_video_parameter_set_id | u(4) |
| .... | u(1) |
| intra_smoothing_disabled_flag | u(1) |
| high_precision_offsets_enabled_flag | u(1) |
| fast_rice_adaptation_enabled_flag | u(1) |
| cabac_bypass_alignment_enabled_flag | u(1) |
| } | |
| if(sps_screen_content_coding_flag{ | |
| intra_block_copy_restriction_enable_flag | u(1) |
| } | |

-continued

| seq_parameter_set_rbsp( ) { | Descriptor |
|---|---|
| if( sps_extension_7bits ) | |
| while( more_rbsp_data( ) ) | |
| sps_extension_data_flag | u(1) |
| rbsp_trailing_bits( ) | |
| } | |

In some embodiments, the following, or equivalent, SPS Semantics are used:

intra_block_copy_restriction_enabled_flag equal to 1 specifies that restriction on bi-prediction is enabled when IBC is used during the decoding process for intra-frame prediction.

intra_block_copy_restriction_enabled_flag equal to 0 specifies that restrictions on bi-prediction based on use of IBC are not applied. When not present, the value of intra_block_copy_enabled_flag may be inferred to be equal to 0.

Decoding Process

The value of inter_pred_idc[x0][y0] that specifies whether list0, list1, or bi-prediction is used for the current prediction unit is derived according to Table 1.

TABLE 1

Name association to inter prediction mode

| | Name of inter_pred_idc | |
|---|---|---|
| inter_pred_idc | (nPbW + nPbH) > intra_block_copy_enabled_flag 16:12 | (nPbW + nPbH) <= intra_block_copy_enabled_flag 16:12 |
| 0 | PRED_L0 | PRED_L0 |
| 1 | PRED_L1 | PRED_L1 |
| 2 | PRED_BI | n/a |

In JCTVC-T1005, adaptive motion vector resolution (AMVR) feature is enabled using a signalled flag "use_integer_mv_flag". The semantics of the flag are as follows.

use_integer_mv_flag being equal to 1 specifies the resolution of motion vectors for inter prediction. When not present, the value of use_integer_mv_flag is inferred to be equal to motion_vector_resolution_control_idc.

use_integer_mv_flag being non-zero specifies that the resolution of luma motion vectors in the current slice are considered as integer pel. Consequently, fractional interpolation may not be required for all luma samples in the slice. When fractional interpolation is not required, the additional samples required for interpolation are not loaded and hence, the worst case memory bandwidth is reduced, and may be lower than the HEVC worst case.

In some embodiments, at least one of uni-prediction and bi-prediction are disabled for inter pictures of a predetermined block size as a result of IBC usage, and further as a result of the state of use_integer_mv_flag. This results in the bandwidth usage staying within the limits of HEVC worst case bandwidth requirement.

In some embodiments, the conditions for disabling bi-prediction includes IBC being enabled, the use_integer_mv_flag being zero, and the prediction block being less than (or less than or equal to) a predefined size. The predefined size may, for example, be 4×4 pixels, 4×8 pixels, 8×4 pixels, 8×8 pixels, 8×16 pixels, 16×16 pixels, 32×32 pixels, or another size. In one example, bi-prediction may be disabled for a prediction block as a result of the prediction block size being less than or equal to an 8×8 size, or another size, in addition to IBC being enabled and use_integer_mv_flag being zero.

In some embodiments, the conditions for disabling uni-prediction includes IBC being enabled, use_integer_mv_flag being zero, and the prediction block is less than (or less than or equal to) a predefined size. The predefined size may, for example, be 4×4 pixels, 4×8 pixels, 8×4 pixels, 8×8 pixels, 8×16 pixels, 16×16 pixels, 32×32 pixels, or another size. In one example, as a result of IBC being enabled and use_integer_mv_flag being zero, the inter-frame uni-prediction is disabled for a prediction block with a size that is less than or equal to an 8×8 size, or another size.

In some embodiments, the conditions for disabling both uni-prediction and bi-prediction includes IBC being enabled, use_integer_mv_flag being zero, and the prediction block is less than (or less than or equal to) a predefined size. The predefined size may, for example, be 4×4 pixels, 4×8 pixels, 8×4 pixels, 8×8 pixels, 8×16 pixels, 16×16 pixels, 32×32 pixels, or another size. In one example, as a result of IBC being enabled and use_integer_mv_flag being zero, the inter-frame uni-prediction and bi-prediction are disabled for a prediction block with a size that is less than or equal to a 16×16 size, or another size.

In some embodiments, the disabling of prediction discussed herein is not applied if a bi-predicted block is bi-predicted from the same reference block, such that the motion vectors of the prediction refer to the same reference block and are identical. For example, the disabling of uni-prediction and/or bi-prediction may have yet another condition to their application—that the bi-predicted block triggering the disabling not be predicted from the same reference block, such that the motion vectors of the prediction refer to the same reference block and are identical.

Figure 5:
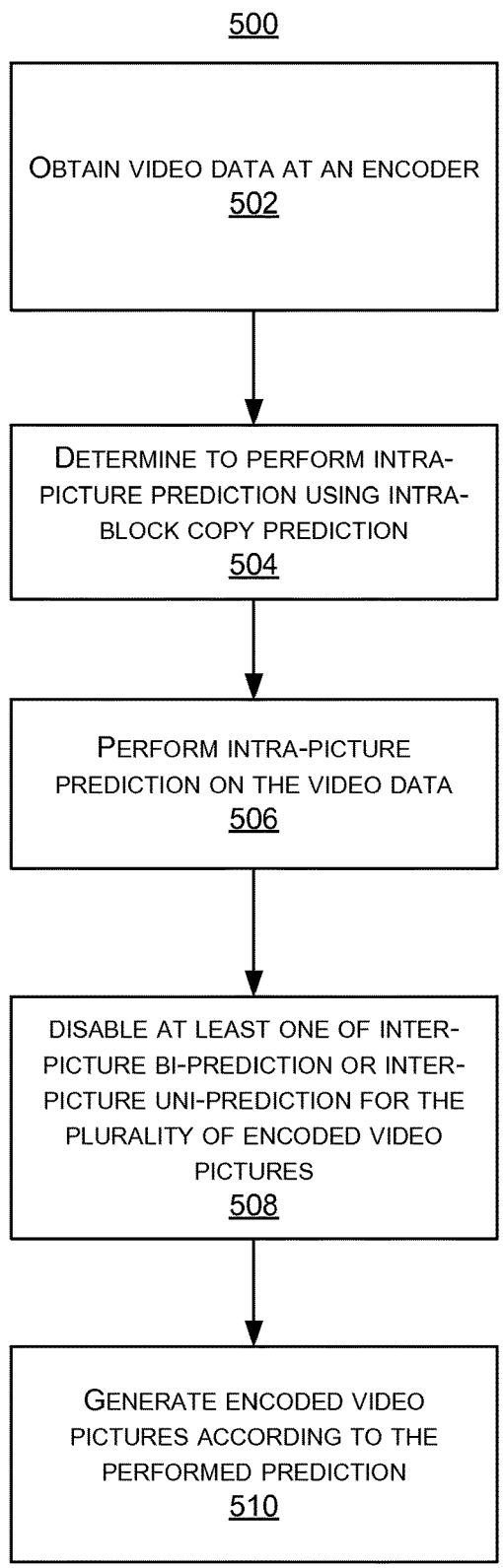
FIG. 5 illustrates an embodiment of a process of encoding video data.

FIG. 5 illustrates an embodiment of a process 500 of encoding video data with IBC and having bi-prediction and/or uni-prediction selectively disabled. The process 500 is implemented to generate a plurality of encoded video pictures. In some aspects, the process 500 may be performed by a computing device or an apparatus, such as the encoding device 104 shown in FIG. 1. For example, the computing device or apparatus may include an encoder, or a processor, microprocessor, microcomputer, or other component of an encoder that is configured to carry out the steps of process 500.

Process 500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 502, the process 500 of encoding video data includes obtaining video data at an encoder. In some embodiments, the encoder is configured to perform inter-picture uni-prediction on the video data to generate a plurality of P prediction units, to perform inter-picture bi-prediction on the video data to generate a plurality of B prediction units, and to perform intra-picture prediction on the video data, using intra-block copy prediction, to encode a prediction unit. When performed, the inter-picture uni-prediction may, for example, generate a plurality of P prediction units. When performed, the inter-picture bi-prediction may, for example, generate a plurality of B prediction units. When performed, the intra-picture prediction uses intra-block copy prediction to generate, for example, a plurality of I prediction units.

At 504, the process 500 includes determining to perform the intra-picture prediction on the video data, using intra-block copy prediction, to generate a plurality of encoded video pictures. The determining, may, for example, be in response to a state indicating an intra-block copy mode. In some embodiments, a signaling flag is generated for a decoder, where the signaling flag indicates the intra-block copy mode. For example, a value of 1 for the signaling flag may indicate that an intra-block copy mode is performed. In another example, a value of 0 for the signaling flag may indicate that an intra-block copy mode is not performed.

At 506, the process 500 includes performing the intra-picture prediction on the video data using the intra-block copy prediction. For example, the intra-picture prediction may be performed using the intra-block copy prediction in accordance with a programmed state of the encoder. The intra-block copy prediction process may include aspects of intra-block copy processes discussed elsewhere herein.

At 508, the process 500 includes, in response to determining to perform the intra-picture prediction on the video data using the intra-block copy prediction, disabling at least one of the inter-picture bi-prediction, or the inter-picture uni-prediction for the plurality of encoded video pictures. In some embodiments, the intra-picture prediction and the disabling are performed in response to the signaling flag. In some embodiments, in response to the signaling flag, both the inter-picture bi-prediction performance and the inter-picture uni-prediction performance are disabled. The disabling of prediction may include aspects or may be in response to other factors discussed elsewhere herein.

At 510, the process 500 includes generating the plurality of encoded video pictures based on the received video according to the intra-block copy prediction, using for example, aspects of processes discussed elsewhere herein. For example, the encoded video pictures may be generated using the intra-block copy prediction on the video data.

In some embodiments, the process 500 includes other aspects discussed herein. For example, in some embodiments, the process 500 includes performing inter-picture uni-prediction on the video data to generate a plurality of P prediction units. In some embodiments, the process 500 includes determining a prediction unit size, wherein performing the inter-picture bi-prediction or uni-prediction is disabled for the plurality of encoded video pictures in response to the combination of both: determining to perform the intra-picture prediction on the video data using the intra-block copy prediction, and the prediction unit size being less than a threshold. In some embodiments, in the process 500, the inter-picture bi-prediction and inter-picture uni-prediction are disabled for the plurality of encoded video pictures in response to the combination.

In some embodiments, the encoder is further capable of adaptive motion vector resolution (AMVR), and the process 500 also includes determining a prediction unit size, wherein the inter-picture bi-prediction or inter-picture uni-prediction is disabled for the plurality of encoded video pictures in response to the combination of all of: determining to perform the intra-picture prediction on the video data using the intra-block copy prediction, the prediction unit size being less than a threshold, and receiving an indication that AMVR is disabled. The combination may further include the inter-prediction bi-prediction having at least one of different reference units and different motion vectors. The inter-picture bi-prediction and inter-picture uni-prediction may be disabled for the plurality of encoded video pictures in response to the combination. The combination may further include the inter-prediction bi-prediction having at least one of different reference units and different motion vectors.

Figure 6:
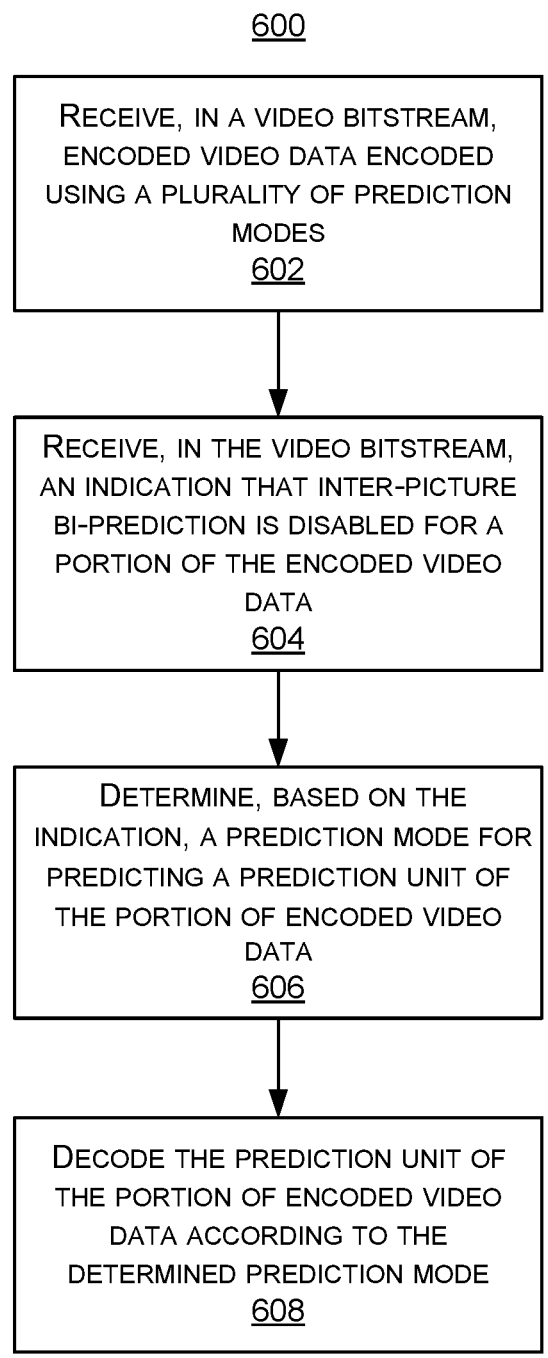
FIG. 6 illustrates an embodiment of a process of decoding video data.

FIG. 6 illustrates an embodiment of a process 600 of decoding video data with IBC and having bi-prediction and/or uni-prediction selectively disabled. The process 600 is implemented to decode a plurality of encoded video pictures. In some aspects, the process 600 may be performed by a computing device or an apparatus, such as the decoding device 112 shown in FIG. 1. For example, the computing device or apparatus may include a decoder, or a processor, microprocessor, microcomputer, or other component of a decoder that is configured to carry out the steps of process 600.

Process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 602, the process 600 of decoding video data includes receiving, in a video stream, encoded video data encoded using a plurality of prediction modes. The video data may be received at a decoder. The plurality of prediction modes comprise an inter-picture uni-prediction mode, an inter-picture bi-prediction mode, and an intra-picture intra-block copy mode. In the inter-picture uni-prediction mode, the decoder is configured to decode according to uni-prediction, for example, as discussed elsewhere herein. In the inter-picture bi-prediction mode, the decoder is configured to decode according to bi-prediction, for example, as discussed elsewhere herein. In the intra-picture intra-block copy mode, the decoder is configured to decode according to intra-block copy prediction, for example, as discussed elsewhere herein.

At 604, the process 600 includes receiving, in the video bitstream, an indication that inter-picture bi-prediction is disabled or that inter-picture bi-prediction restriction is enabled for a portion of the encoded video data. The indication, may, for example, be a signaling flag being in a state indicating that inter-picture bi-prediction is disabled or that inter-picture bi-prediction restriction is enabled. For example, a value of 1 for the signaling flag may indicate that inter-picture bi-prediction restriction is enabled or that inter-picture bi-prediction is disabled. In another example, a value of 0 for the signaling flag may indicate that inter-picture bi-prediction restriction is enabled or that inter-picture bi-prediction is disabled.

At 606, the process 600 includes determining, based on the indication, a prediction mode from the plurality of prediction modes for predicting a prediction unit of the portion of encoded video data. In some embodiments, the portion of the encoded video data includes a plurality of pictures, such as a sequence of pictures. Furthermore, at 608, the process 600 includes decoding the prediction unit of the portion of encoded video data according to the determined prediction mode, using for example, aspects of processes discussed elsewhere herein.

In some embodiments, the process 600 includes other aspects discussed herein. For example, process 600 may include, in response to the indication, excluding the inter-picture bi-prediction prediction mode from use for predicting the prediction unit of the portion of encoded video data.

Reference Sample Restriction for IBC

In order to keep the HEVC worst case bandwidth requirement unchanged, restrictions may be additionally or alternatively applied to reference samples as a consequence of IBC being used.

In some embodiments, the restrictions on reference samples discussed herein cause the restricted prediction blocks to be unavailable for use as reference samples. In some embodiments, corresponding surrogate reference samples are generated by predefined padding schemes and may be used for prediction.

For example, the surrogate reference samples may be generated through horizontal or vertical padding from the neighboring samples, in which case data from one or more neighboring samples is copied to generate the surrogate reference samples. Alternatively, the surrogate reference samples may be generated with data equal to a predefined value. For example, the predefined value is equal to $2<<(B-1)$, where B is the bitdepth of the sample.

In some embodiments, when IBC is enabled, potential reference samples for IBC from a prediction block with bi-prediction are excluded or disqualified from being used as reference samples. In some embodiments, when IBC is enabled, potential reference samples for IBC from a prediction block with bi-prediction are excluded or disqualified from being used as reference samples as a result of the further condition that the prediction block size is less than or equal to a predefined size. The predefined size may, for example, be 4×4 pixels, 4×8 pixels, 8×4 pixels, 8×8 pixels, 8×16 pixels, 16×16 pixels, 32×32 pixels, or another size. In some embodiments, when IBC is enabled, potential reference samples for IBC from prediction blocks with inter mode prediction are excluded or disqualified from being used as reference samples.

In some embodiments, when IBC is enabled, potential reference samples for IBC from a prediction block with inter-mode prediction are excluded or disqualified from being used as reference samples if the prediction block size is less than or equal to a predefined size. The predefined size may, for example, be 4×4 pixels, 4×8 pixels, 8×4 pixels, 8×8 pixels, 8×16 pixels, 16×16 pixels, 32×32 pixels, or another size.

In some embodiments, when IBC is enabled, potential reference samples for IBC from a prediction block predicted with bi-prediction mode (e.g., based on JCTVC-P1005_v4) are excluded or disqualified from being used as reference samples.

In some embodiments, the restrictions on reference samples discussed herein are applied at the CTU level based on, for example, the mode and/or block size of the reference samples in that CTU. For example, if IBC is used within a particular CTU, and if the block size is less than 8×8 pixels, one or more of the restrictions on reference samples discussed herein may be applied to the entire particular CTU.

In some embodiments, the restrictions on references samples discussed herein are applied for CTUs which are outside the current CTU, and are not applied for the current CTU. In some embodiments, the restrictions on references samples discussed herein are applied for CTUs which are outside the current and next left CTU, and are not applied for the current and next left CTU.

In some embodiments, the application of the restrictions on reference samples discussed herein is conditioned on use_integer_mv_flag flag being zero. Accordingly, the restrictions may be applied if use_integer_mv_flag is zero, and may be not applied if use_integer_mv_flag is not zero.

In some embodiments, when IBC is enabled, potential reference samples for IBC from a CTU that has at least one prediction block with bi-prediction are excluded or disqualified from being used as reference samples. In another example, when IBC is enabled, potential reference samples for IBC from a CTU that has number of prediction samples with bi-prediction greater than a threshold are excluded or disqualified from being used as reference samples. The threshold may be, for example, 250, 500, 1000, 5000 samples, or any other suitable number of prediction samples.

In some embodiments, when IBC is enabled, potential reference samples for IBC from a CTU that has at least one prediction block with bi-prediction are excluded or disqualified from being used as reference samples if that prediction block size is less than or equal to a predefined size. The predefined size may, for example, be 4×4 pixels, 4×8 pixels, 8×4 pixels, 8×8 pixels, 8×16 pixels, 16×16 pixels, 32×32 pixels, or another size.

In some embodiments, when IBC is enabled, potential reference samples for IBC from a CTU that has number of prediction samples with bi-prediction greater than a threshold if their size is less than or equal to a predefined size are excluded or disqualified from being used as reference samples. The threshold number may be, for example, 250, 500, 1000, 5000 samples, or any other suitable number of prediction samples. The predefined size may, for example, be 4×4 pixels, 4×8 pixels, 8×4 pixels, 8×8 pixels, 8×16 pixels, 16×16 pixels, 32×32 pixels, or another size.

In some embodiments, when IBC is enabled, potential reference samples for IBC from a CTU that has at least one prediction block used for interpolation are excluded or disqualified from being used as reference samples. In another example, when IBC is enabled, potential reference samples for IBC from a CTU that has number of prediction samples used for interpolation greater than a threshold are excluded or disqualified from being used as reference samples. The threshold may be, for example, 250, 500, 1000, 5000 samples, or any other suitable number of prediction samples.

In some embodiments, when IBC is enabled, potential reference samples for IBC from a CTU that has at least one prediction block used for interpolation are excluded or disqualified from being used as reference samples if that prediction block size is less than or equal to a predefined size. The predefined size may, for example, be 4×4 pixels, 4×8 pixels, 8×4 pixels, 8×8 pixels, 8×16 pixels, 16×16 pixels, 32×32 pixels, or another size.

In some embodiments, when IBC is enabled, potential reference samples for IBC from a CTU that has number of prediction samples used for interpolation greater than a threshold are excluded or disqualified from being used as reference samples if their size is less than or equal to a predefined size. The predefined size may, for example, be 4×4 pixels, 4×8 pixels, 8×4 pixels, 8×8 pixels, 8×16 pixels, 16×16 pixels, 32×32 pixels, or another size The threshold may be, for example, 250, 500, 1000, 5000 samples, or any other suitable number of prediction samples.

In some embodiments, the restrictions on references samples described above are similarly applied to potential reference samples which are interpolation samples.

In some embodiments, the restrictions on reference samples discussed herein are not applied if a bi-predicted block is bi-predicted from the same reference block, such that the motion vectors of the prediction refer to the same reference block and are identical. For example, the disabling of uni-prediction and/or bi-prediction may have yet another condition to their application—that the bi-predicted block triggering the application of the restriction not be predicted from the same reference block, such that the motion vectors of the prediction refer to the same reference block and are identical.

An example specification text based on JCTVC-P1005_v4 with local search area for B slices is discussed below. Embodiments discussed herein conform with the example specification text.

Decoding Process

A derivation process for block vector components in intra-block copying prediction mode is described. Embodiments discussed herein conform with the derivation process.

Inputs to this process are:
a luma location (xCb, yCb) of the top-left sample of the current luma coding block relative to the top-left luma sample of the current picture, and
a variable log 2CbSize specifying the size of the current luma coding block.

Output of this process is the (nCbS)×(nCbX) array [may be referred to as a single vector] of block vectors bvIntra.

The variables nCbS, nPbSw, and nPbSh are derived as follows:

$$nCbS=1<<\log 2CbSize \qquad (8\text{-}25)$$

$$nPbSw=nCbS/(\text{PartMode}==\text{PART\_2}N\times 2N\|\text{PartMode}==\text{PART\_2}N\times N?1:2) \qquad (8\text{-}25)$$

$$nPbSh=nCbS/(\text{PartMode}==\text{PART\_2}N\times 2N\|\text{PartMode}==\text{PART\_}N\times 2N?1:2) \qquad (8\text{-}25)$$

The variable BvpIntra[compIdx] specifies a block vector predictor. The horizontal block vector component is assigned compIdx=0 and the vertical block vector component is assigned compIdx=1.

Depending upon PartMode, the variable numPartitions is derived as follows:

If PartMode is equal to PART_2N×2N, numPartitions is set equal to 1.
Otherwise, if PartMode is equal to either PART_2N×N or PART_N×2N, numPartitions is set equal to 2.
Otherwise (PartMode is equal to PART_N×N), numPartitions is set equal to 4.

The array of block vectors bvIntra is derived by the following ordered steps, for the variable blkIdx proceeding over the values 0 . . . (numPartitions−1):

The variable blkInc is set equal to (PartMode==PART_2N×N?2:1).
    The variable xPb is set equal to xCb+nPbSw*(blkIdx*blkInc % 2).
    The variable yPb is set equal to yCb+nPbSh*(blkIdx/2)
    The following ordered steps apply, for the variable compIdx proceeding over the values 0 . . . 1:
    Depending upon the number of times this process has been invoked for the current coding tree unit, the following applies:
        If this process is invoked for the first time for the current coding tree unit, bvIntra[xPb][yPb][compIdx] is derived as follows:

$$bvIntra[xPb][yPb][0]=BvdIntra[xPb][yPb][0]-nCbS \qquad (8\text{-}25)$$

$$bvIntra[xPb][yPb][1]=BvdIntra[xPb][yPb][1] \qquad (8\text{-}25)$$

Otherwise, bvIntra[xPb][yPb][compIdx] is derived as follows:

$$bvIntra[xPb][yPb][0]=BvdIntra[xPb][yPb][0]+BvpIntra[0] \qquad (8\text{-}25)$$

$$bvIntra[xPb][yPb][1]=BvdIntra[xPb][yPb][1]+BvpIntra[1] \qquad (8\text{-}25)$$

The value of BvpIntra[compIdx] is updated to be equal to bvIntra[xPb][yPb][compIdx].
    For use in derivation processes of variables invoked later in the decoding process, the following assignments are made for x=0 . . . nPbSw−1 and y=0 . . . nPbSh−1:

$$bvIntra[xPb+x][yPb+y][compIdx]=bvIntra[xPb][yPb][compIdx] \qquad (8\text{-}25)$$

It is a requirement of bitstream conformance that all of the following conditions are true:
    The value of bvIntra[xPb][yPb][0] shall be greater than or equal to −(xPb % CtbSizeY+64).
    The value of bvIntra[xPb][yPb][1] shall be greater than or equal to −(yPb % CtbSizeY).
    When the derivation process for z-scan order block availability is invoked with (xCurr, yCurr) set equal to (xCb, yCb) and the neighboring luma location (xNbY, yNbY) set equal to (xPb+bvIntra[xPb][yPb][0], yPb+bvIntra[xPb][yPb][1]) as inputs, the output shall be equal to TRUE.
    When the derivation process for z-scan order block availability is invoked with (xCurr, yCurr) set equal to (xCb, yCb) and the neighboring luma location (xNbY, yNbY) set equal to (xPb+bvIntra[xPb][yPb][0]+nPbSw−1, yPb+bvIntra [xPb][yPb][1]+nPbSh−1) as inputs, the output shall be equal to TRUE.
    One or both of the following conditions shall be true:
        bvIntra[xPb][yPb][0]+nPbSw<=0
        bvIntra[xPb][yPb][1]+nPbSh<=0
    Inter_pred_idc[x][y] shall be equal to 0 or 1, with x=xPb+BvIntra[xPb][yPb][0]·xPb+BvIntra[xPb][yPb][0]+(1<<log 2CbSize)−1,y=yPb+BvIntra[xPb][yPb][1] . . . y0+BvIntra[xPb][yPb][1]+(1<<log 2CbSize)−1;

Adaptive Search Area Based on Picture Type/Slice Type/Partition Size

To improve the cache usage and reduce cache misses, which would otherwise occur as a result of IBC block vectors and inter motion vectors, some constraints on the block vector range may be applied.

The block vector range constraints may be applied individually or in combination. In the block vector range constraints, the region of interest is not limited and may, for example, be a CU, a CTB, a largest coding unit (LCU), a slice, a tile, or a set of CU's, CTU's, CTB's, LCU's, slices, or tiles.

In some embodiments, the search area is determined based on one or more of the picture type, the slice type, and the partition size. Additionally, a syntax element may be used to specify the search area for each corresponding picture type, slice type, and partition size.

As an example, if the current slice is a B-slice, the search area for the IBC blocks may be constrained to be the local region of the current CTB. In some embodiments, the search area is constrained to the causal neighborhood in the current CTB and the adjacent left CTB as a consequence of the current slice being a B-slice.

In some embodiments, the size, the shape, or the location of the search area is specified by the syntax element. In some embodiments, the syntax element is, for example, signaled in the bitstream at one or more of VPS, SPS, PPS, VUI, slice header, or CU header.

In some embodiments, a range of the block vector that is coded in the bitstream is constrained based on one or more of the picture type, the slice type, and the partition size. Additionally, a syntax element may be used to specify a maximum block vector range for each corresponding picture type, slice type, and partition size. For example, in some embodiments, one or more syntax elements may be used to specify that the maximum block vector range is respectively equal to 100, 500, and 1000 pixels for CRA, BLA, and IDR picture types. Similarly, one or more syntax elements be used to specify a maximum block vector range for each of I slices, B slices, P slices, and GPB slices, and one or more syntax elements be used to specify a maximum block vector range for each of partition sizes including 4×4 pixels, 8×8 pixels, 16×16 pixels, 32×32 pixels, and 64×64 pixels.

In some embodiments, the search area and maximum block vector range syntax elements may signaled in one or more of the following parameter sets: VPS, SPS, PPS, video usability information (VUI), slice header or their respective extensions.

An example specification text based on JCTVC-P1005_v4 with local search area for B slices is discussed below. Embodiments discussed herein conform with the example specification text.

Decoding Process

A derivation process for block vector components in intra-block copying prediction mode is described.

Inputs to this process are:
    a luma location (xCb, yCb) of the top-left sample of the current luma coding block relative to the top-left luma sample of the current picture,
    a variable log 2CbSize specifying the size of the current luma coding block.

Output of this process is the (nCbS)×(nCbX) array [may be referred to as a single vector] of block vectors bvIntra.

The variables nCbS, nPbSw, and nPbSh are derived as follows:

nCbS=1<<log 2CbSize (8-25)

nPbSw=nCbS/(PartMode==PART_2N×
2N∥PartMode==PART_2N×N?1:2) (8-25)

nPbSh=nCbS/(PartMode==PART_2N×
2N∥PartMode==PART_N×2N?1:2) (8-25)

The variable BvpIntra[compIdx] specifies a block vector predictor. The horizontal block vector component is assigned compIdx=0 and the vertical block vector component is assigned compIdx=1.

Depending upon PartMode, the variable numPartitions is derived as follows:

If PartMode is equal to PART_2N×2N, numPartitions is set equal to 1.

Otherwise, if PartMode is equal to either PART_2N×N or PART_N×2N, numPartitions is set equal to 2.

Otherwise (PartMode is equal to PART_N×N), numPartitions is set equal to 4.

The array of block vectors bvIntra is derived by the following ordered steps, for the variable blkIdx proceeding over the values 0 . . . (numPartitions−1):

The variable blkInc is set equal to (PartMode==PART_2N×N?2:1).

The variable xPb is set equal to xCb+nPbSw*(blkIdx*blkInc % 2).

The variable yPb is set equal to yCb+nPbSh*(blkIdx/2)

The following ordered steps apply, for the variable compIdx proceeding over the values 0 . . 1:

Depending upon the number of times this process has been invoked for the current coding tree unit, the following applies:

If this process is invoked for the first time for the current coding tree unit, bvIntra[xPb][yPb][compIdx] is derived as follows:

bvIntra[xPb][yPb][0]=BvdIntra[xPb][yPb][0]−nCbS (8-25)

bvIntra[xPb][yPb][1]=BvdIntra[xPb][yPb][1] (8-25)

Otherwise, bvIntra[xPb][yPb][compIdx] is derived as follows:

bvIntra[xPb][yPb][0]=BvdIntra[xPb][yPb][0]+BvpIntra[0] (8-25)

bvIntra[xPb][yPb][1]=BvdIntra[xPb][yPb][1]+BvpIntra[1] (8-25)

The value of BvpIntra[compIdx] is updated to be equal to bvIntra[xPb][yPb][compIdx].

For use in derivation processes of variables invoked later in the decoding process, the following assignments are made for x=0 . . . nPbSw−1 and y=0 . . . nPbSh−1:

bvIntra[xPb+x][yPb+y][compIdx]=bvIntra[xPb][yPb][compIdx] (8-25)

It is a requirement of bitstream conformance that all of the following conditions are true:

For B slice type, the value of bvIntra[xPb][yPb][0] shall be greater than or equal to −(xPb % CtbSizeY+64).

For B slice type, the value of bvIntra[xPb][yPb][1] shall be greater than or equal to −(yPb % CtbSizeY).

When the derivation process for z-scan order block availability is invoked with (xCurr, yCurr) set equal to (xCb, yCb) and the neighboring luma location (xNbY, yNbY) set equal to (xPb+bvIntra[xPb][yPb][0], yPb+bvIntra[xPb][yPb][1]) as inputs, the output shall be equal to TRUE.

When the derivation process for z-scan order block availability is invoked with (xCurr, yCurr) set equal to (xCb, yCb) and the neighboring luma location (xNbY, yNbY) set equal to (xPb+bvIntra[xPb][yPb][0]+nPbSw−1, yPb+bvIntra [xPb][yPb][1]+nPbSh−1) as inputs, the output shall be equal to TRUE.

One or both of the following conditions shall be true:
bvIntra[xPb][yPb][0]+nPbSw<=0
bvIntra[xPb][yPb][1]+nPbSh<=0

Figure 7:
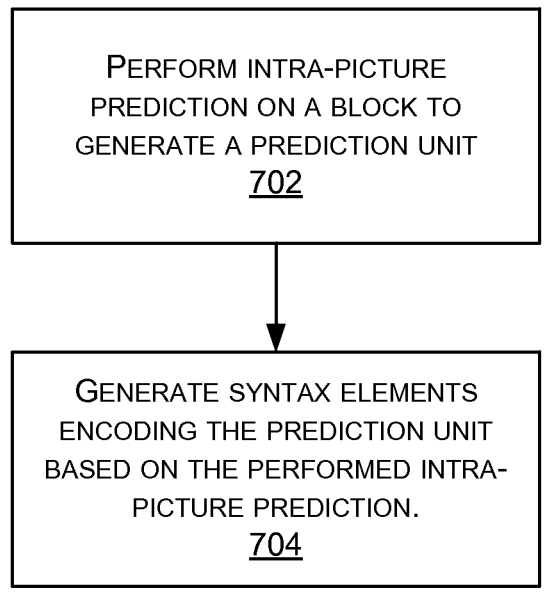
FIG. 7 illustrates an embodiment of a process of encoding video data.

FIG. 7 illustrates an embodiment of a process 700 of encoding video data. The process 700 is implemented to generate a plurality of encoded video pictures. In some aspects, the process 700 may be performed by a computing device or an apparatus, such as the encoding device 104 shown in FIG. 1. For example, the computing device or apparatus may include an encoder, or a processor, microprocessor, microcomputer, or other component of an encoder that is configured to carry out the steps of process 700.

Process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 702, the process 700 includes performing intra-picture prediction on a block of one of the pictures to generate a prediction unit. In some embodiments, performing the intra-picture prediction includes selecting a reference block for intra-block copy prediction of a coding tree unit (CTU), wherein the selected reference block is selected from a plurality of encoded blocks, and wherein blocks within the CTU encoded with bi-prediction are excluded from selection as the reference block. Performing the intra-picture prediction may also include performing intra-block copy prediction on the reference block to generate the prediction unit.

At 704, the process 700 includes generating syntax elements encoding the prediction unit based on the performed intra-picture prediction.

In some embodiments, the process 700 includes other aspects discussed herein. For example, the process 700 may include determining a prediction unit size, wherein blocks encoded with bi-prediction are excluded from selection at least partly in response to the prediction unit size being less than a threshold. In some embodiments, in process 700, one or more blocks encoded with inter-prediction are excluded from selection as the reference block. For example, the one or more blocks encoded with inter-prediction may be excluded from selection as the reference block for encoding further blocks of the CTU. In such embodiments, the process may also include determining a prediction unit size, wherein blocks encoded with inter-prediction are excluded from selection at least partly in response to the prediction unit size being less than a threshold.

In some embodiments, in process 700, a surrogate reference block is generated using a padding scheme. In some embodiments, performing intra-block copy prediction includes using the surrogate block as the selected reference block.

In some embodiments, process 700 includes determining whether the CTU has a prediction block generated with bi-prediction, wherein blocks encoded with bi-prediction are excluded from selection at least partly in response to the CTU having a prediction block generated with bi-prediction. In such embodiments, process 700 may also include determining a quantity of prediction blocks generated with bi-prediction for the CTU, and determining a prediction unit size. Blocks encoded with bi-prediction may then excluded from selection in response to any of: the CTU having a quantity of prediction blocks generated with bi-prediction greater than a threshold, the prediction unit size being less than a threshold, and the CTU having a quantity of prediction blocks generated with bi-prediction greater than a threshold, and the prediction unit size being less than a threshold.

In some embodiments, process 700 includes performing adaptive motion vector resolution (AMVR) and determining a prediction unit size. In such embodiments, blocks encoded with bi-prediction may be excluded from selection at least partly in response to the combination of both of: the prediction unit size being less than a threshold, and receiving an indication that AMVR is disabled. In some embodiments, the combination further includes the inter-prediction bi-prediction having at least one of different reference units and different motion vectors.

In some embodiments, process 700 includes determining a search area comprising the encoded blocks, wherein the search area is determined based at least in part on at least one of: a picture type, a slice type, and a partition size.

Restriction on the Distribution of Block Vectors within a Region of Interest.

To improve the cache usage and reduce the cache misses when using larger search ranges, some constraints on the block vector range may be applied.

The block vector range constraints may be applied individually or in combination. For the block vector range constraints, the region of interest is not limited and may, for example, be a CU, a CTB, a largest coding unit (LCU), a slice, a tile, or a set of CU's, CTU's, CTB's, LCU's, slices, or tiles.

In some embodiments, the range of the block vectors is constrained to be within the region of interest. For example, the range of block vectors may be constrained to be within a current CU. In some embodiments, different regions of interest have different block vector range constraints. Additionally, a syntax element may be used to specify the block vector range for each region of interest.

As an example, the ranges of the block vectors may be constrained to be within a tile. Accordingly, the prediction samples for a current prediction unit are constrained to be from within the same tile. Among other benefits, this constraint facilitates efficient parallel processing. In some embodiments, the ranges of the block vectors are constrained to be within a slice. Accordingly, IBC prediction is constrained to not cross slice boundaries.

In some embodiments, the maximum difference of any two block vectors within a region of interest is constrained. For example, if a CU within a slice region of interest has a block vector of a particular size, all other block vectors within the slice are limited to be within a predefined range of the particular size. Additionally, a syntax element may be used to specify the maximum difference of any two block vectors for each region of interest.

Specification Text and Syntax

In some embodiments, the block vector range and maximum block vector difference syntax elements may signaled in one or more of the following parameter sets: VPS, SPS, PPS, video usability information (VUI), slice header or their respective extensions.

An example specification text based on JCTVC-P1005_v4 with local search area for B slices is discussed below. Embodiments discussed herein conform with the example specification text.

Decoding Process

The variable BvIntra[x0][y0][compIdx] specifies a vector component to be used for the intra-block copying prediction mode. The array indices x0, y0 specify the location (x0, y0) of the top-left luma sample of the considered prediction block relative to the top-left luma sample of the picture. The variable BvdispIntra[x0][y0][compIdx] specifies the difference between vector component to be used for the intra-block copying prediction mode for location (x0, y0) (e.g., BvIntra[x0][y0][compIdx]) and location (xi, yj) (e.g., BvIntra[xi][yj][compIdx]). The array indices xi, yj specify the location (xi, yj) of the top-left luma sample of the considered prediction block relative to the top-left luma sample of the picture for any i, j such that the location (xi, yj) and (x0, y0) are within the same CTU.

For all i, j, BvdispIntra[xi][yj][compIdx] shall be in the range of −128 to 128, inclusive. The horizontal block vector component is assigned compIdx=0 and the vertical block vector component is assigned compIdx=1.

In the above specification the range of −128 to 128, inclusive, is used as an example and the actual value of the range might be fixed to different value or signaled.

Below an example signaling method is shown.

| vui_parameters( ) { | Descriptor |
|---|---|
| .... | |
| bitstream_restriction_flag | u(1) |
| if( bitstream_restriction_flag ) { | |
| ...... | |
| log2_max_ctu_deltaBV_length_horizontal | ue(v) |
| log2_max_ctu_deltaBV_length_vertical | ue(v) |
| } | |
| } | | log 2_max_ctu_deltaBV_length_horizontal and log 2_max_ctu_deltaBV_length_vertical indicate the maximum absolute difference value of a decoded horizontal and vertical block vector component, respectively, with respect to the decoded horizontal and vertical block vector component, respectively, of any prediction unit that belongs to the same CTU and available, in integer luma sample units, for all pictures in the CVS. A value of n asserts that no difference value of a block vector component is outside the range of $-2^n$ to $2^n-1$, inclusive, in units of integer luma sample displacement. Range and inference values may be determined.

For all i, j, BvdispIntra[xi][yj][compIdx] shall be in the range as specified by log 2_max_ctu_deltaBV_length_horizontal and log 2_max_ctu_deltaBV_length_vertical for horizontal and vertical components. The horizontal block vector component is assigned compIdx=0 and the vertical block vector component is assigned compIdx=1.

Alternatively, the range may be different for each compIdx (horizontal and vertical block vector) as well as for luma and chroma component. Alternatively, the range may be different for each compIdx (horizontal and vertical block vector) as well as for luma and chroma component.

Alternatively, the range may be signaled as multiple of CTU's, slices, tiles etc.

| vui_parameters( ) { | Descriptor |
|---|---|
| .... | |
| bitstream_restriction_flag | u(1) |
| if( bitstream_restriction_flag ) { | |
| ...... | |
| log2_max_BV_ctu_length_horizontal | ue(v) |
| log2_max_BV_ctu_length_vertical | ue(v) |
| } | |
| } | | log 2_max_BV_ctu_length_horizontal and log 2_max_BV_ctu_length_vertical indicate the maximum absolute difference value of a decoded horizontal and vertical block vector component, respectively, with respect to the decoded horizontal and vertical block vector component, respectively, of any prediction unit that belongs to the same CTU and available, in the units of the CTB, for all pictures in the CVS. A value of n asserts that no difference value of a block vector component is outside the range of −N to N, inclusive, in units of CTB displacement.

Restriction on the Number of Block Vectors within a Region of Interest

As discussed above, IBC may increase the worst case number of block vectors for low delay P case. At least to maintain the same worst case complexity as HEVC and also to reduce the load on system resources (e.g., to reduce a number of prediction sample loads), some embodiments include additional or alternative features.

For example, the number of block vectors within a particular region of interest may be constrained to be less than or equal to the worst case number of block vectors of HEVC for the particular region of interest. For example, the number of block vectors within a region of interest may be constrained to be equal to or less than the worst case number of block vectors that would exist if all the blocks are coded as N×2N/2N×N for the same region of interest. In some embodiments, IBC mode may be restricted for smallest partition (N×N) of non I-Slices.

The block vector number constraints and the restriction of IBC mode may be applied individually or in combination. In the block vector number constraints and the restriction of IBC, the region of interest is not limited and may, for example, be a CU, a CTB, a largest coding unit (LCU), a slice, a tile, or a set of CU's, CTU's, CTB's, LCU's, slices, or tiles.

Constraint I-Slice

In some embodiments, the ranges of the block vectors may be constrained to be within a slice. That is, IBC prediction does not cross slice boundaries.

In some embodiments, a new slice type may be signaled. For the new slice type, the ranges of the block vectors are constrained to be within the slice. As a result, IBC prediction does not cross slice boundaries for slices of the new slice type.

In some embodiments, a flag may specify that the ranges of the block vectors are constrained to be within slices. As a result of the state of the flag, IBC prediction does not cross slice boundaries. The flag may, for example, be signaled in one or more of the following parameter sets: VPS, SPS, PPS, video usability information (VUI), slice header or their respective extensions.

Using the techniques and systems described herein intra-block copy techniques are performed with reduced memory bandwidth and size requirements. As a result, memory bandwidth efficiency is improved, worst case memory accesses are limited, and other aspects of intra-block copy is enhanced.

The coding techniques discussed herein may be implemented in an example video encoding and decoding system (e.g., system 100). A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 8:
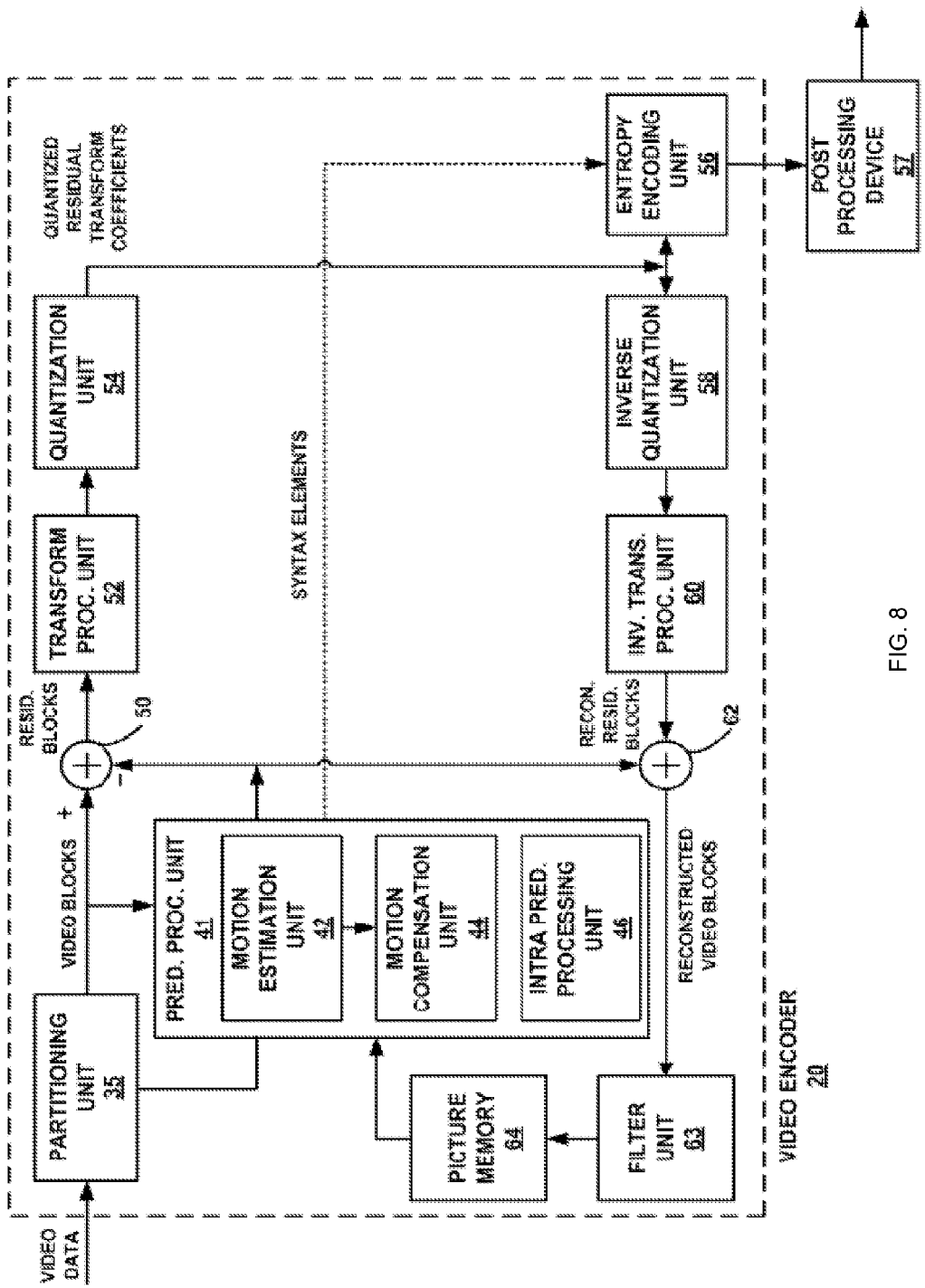
FIG. 8 is a block diagram illustrating an example video encoder, in accordance with some embodiments.
Figure 9:
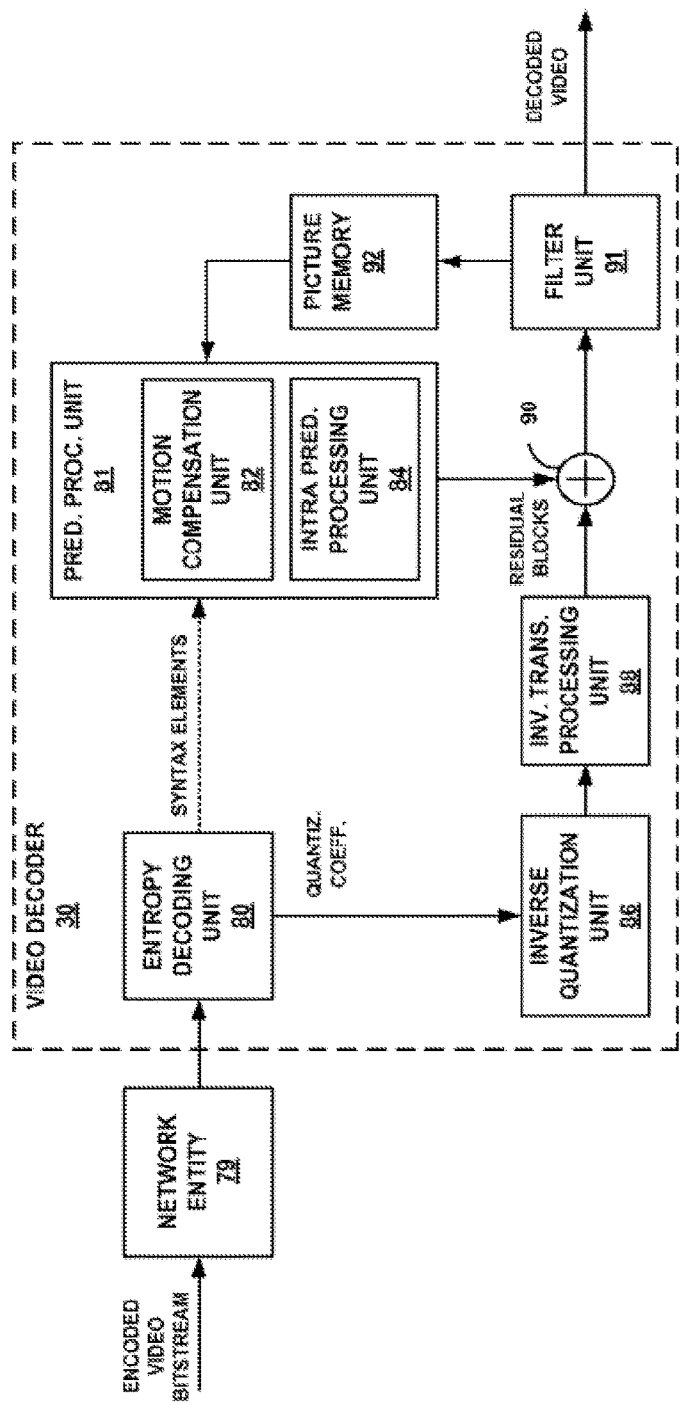
FIG. 9 is a block diagram illustrating an example video decoder, in accordance with some embodiments.

Specific details of the encoding device 104 and the decoding device 112 are shown in FIG. 8 and FIG. 9, respectively. FIG. 8 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 8 as being an in loop filter, in other configurations, filter unit 63 may be implemented as a post loop filter. A post processing device 57 may perform additional processing on encoded video data generated by encoding device 104. The techniques of this disclosure may in some instances be implemented by encoding device 104. In other instances, however, one or more of the techniques of this disclosure may be implemented by post processing device 57.

As shown in FIG. 8, encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. Encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, encoding device 104 may calculate values for sub-integer pixel positions of reference pictures stored in picture memory 64. For example, encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. Encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform.

Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to decoding device 112, or archived for later transmission or retrieval by decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, encoding device 104 of FIG. 8 represents an example of a video encoder configured to generate syntax for a encoded video bitstream. Encoding device 104 may, for example, generate VPS, SPS, and PPS parameter sets as described above. The encoding device 104 may perform any of the techniques described herein, including the processes described above with respect to FIGS. 4, 6, and 8. The techniques of this disclosure have generally been described with respect to encoding device 104, but as mentioned above, some of the techniques of this disclosure may also be implemented by post processing device 57.

FIG. 9 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. Decoding device 112 may, in some examples, perform a decoding pass generally reciprocal to the encoding pass described with respect to encoding device 104 from FIG. 8.

During the decoding process, decoding device 112 receives an encoded video bitstream that represents video blocks of an encoded video slice and associated syntax elements sent by encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include encoding device 104. Some of the techniques described in this disclosure may be implemented by network entity 79 prior to network entity 79 transmitting the encoded video bitstream to decoding device 112. In some video decoding systems, network entity 79 and decoding device 112 may be parts of separate devices, while in other instances, the functionality described with respect to network entity 79 may be performed by the same device that comprises decoding device 112.

The entropy decoding unit 80 of decoding device 112 entropy decodes the bitstream to generate quantized coefficients, motion vectors, and other syntax elements. Entropy decoding unit 80 forwards the motion vectors and other syntax elements to prediction processing unit 81. Decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. Video decoder 30 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by encoding device 104 during encoding of the video blocks to calculate interpolated values for sub-integer pixels of reference blocks. In this case, motion compensation unit 82 may determine the interpolation filters used by video encoder 20 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 9 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of encoding video data to generate one or more encoded video pictures, the method comprising:

obtaining video data at an encoder, the video data including a plurality of pictures;
determining that inter-picture prediction is enabled for a picture from the plurality of pictures;
determining that intra-block copy is enabled as an intra-picture prediction mode for the picture;
disabling, in response to determining that intra-block copy is enabled for the picture, bi-prediction as an inter-picture prediction mode for the picture;
determining to use intra-block copy to perform intra-picture prediction for a block from the picture to generate the one or more encoded video pictures;
determining a set of reference blocks from previously encoded blocks from the picture, wherein the set of reference blocks are determined for performing intra-block copy prediction, and wherein the set of reference blocks do not include reference blocks predicted with bi-prediction due to disabling of bi-prediction for the picture;
selecting a reference block from the set of reference blocks;
performing intra-block copy prediction with the reference block to generate a prediction unit; and
generating the one or more encoded video pictures using the prediction unit.

2. The method of claim 1, further comprising performing inter-picture uni-prediction on the video data to generate a plurality of P prediction units.

3. The method of claim 1, further comprising:
determining a prediction unit size, wherein disabling bi-prediction is additionally in response to a combination of both: determining to perform the intra-picture prediction on the video data using the intra-block copy prediction and the prediction unit size being less than a threshold.

4. The method of claim 1, further comprising:
determining a prediction unit size; and
determining that adaptive motion vector resolution (AMVR) is disabled, wherein disabling bi-prediction is additionally in response to determining that the prediction unit size is less than a threshold and determining that AMVR is disabled.

5. The method of claim 4, wherein disabling bi-prediction is further based on the bi-prediction resulting in at least one of different reference units or different motion vectors.

6. The method of claim 1, wherein disabling of bi-prediction is indicated in using a parameter that is included with the one or more encoded video pictures.

7. The method of claim 6, wherein the parameter further indicates a portion of the video data to which the disabling applies.

8. An apparatus for encoding video data, the apparatus comprising:
a memory configured to store video data, the video data including a plurality of pictures; and
a processor configured to:
determine that inter-picture prediction is enabled for a picture from the plurality of pictures;
determine that intra-block copy is enabled as an intra-picture prediction mode for the picture;
disable, in response to determining that intra-block copy is enabled for the picture, bi-prediction as an inter-picture prediction mode for the picture;
determine to use intra-block copy prediction to perform intra-picture prediction for a block from the picture to generate one or more encoded video pictures;
determine a set of reference blocks from previously encoded blocks from the picture, wherein the set of reference blocks are determined for performing the intra-block copy prediction, and wherein the set of reference blocks do not include reference blocks predicted with bi-prediction due to disabling of bi-prediction for the picture;
select a reference block from the set of reference blocks;
perform the intra-block copy prediction with the reference block to generate a prediction unit; and
generate the one or more encoded video pictures using the prediction unit.

9. The apparatus of claim 8, wherein the processor is further configured to determine:
a prediction unit size, wherein disabling bi-prediction is additionally in response to determining that the prediction unit size is less than a threshold.

10. The apparatus of claim 8, wherein the processor is further configured to:
determine a prediction unit size; and
determine that adaptive motion vector resolution (AMVR) is disabled, wherein disabling bi-prediction is additionally in response to determining that the prediction unit size is less than a threshold and determining that AMVR is disabled.

11. The apparatus of claim 10, wherein disabling bi-prediction is further based on the bi-prediction resulting in at least one of different reference units or different motion vectors.

12. The apparatus of claim 8, wherein disabling of bi-prediction is indicated in using a parameter that is included with the one or more encoded video pictures.

13. The apparatus of claim 12, wherein the parameter further indicates a portion of the video data to which the disabling applies.

14. A method of decoding video data to generate one or more decoded video pictures, the method comprising:
receiving, in a video bitstream, encoded video data, wherein the encoded video data includes a plurality of pictures, and wherein the encoded video data is encoded using a plurality of prediction modes, the plurality of prediction modes including an inter-picture uni-prediction mode, an inter-picture bi-prediction mode, and an intra-picture intra-block copy mode;
determining, using data provided in the video bitstream, that bi-prediction is disabled as an inter-picture prediction mode for a picture from the plurality of pictures, wherein bi-prediction is disabled in response to intra-block copy mode being enabled for the picture;
determining, using syntax elements in the video bitstream, that a block from the picture was predicted using intra-block copy mode;
determining, from the syntax elements, a reference block from among previously decoded blocks of the picture, wherein the reference block was not predicted using bi-prediction due to bi-prediction being disabled for the picture; and
reconstructing the block from the reference block based on the block having been predicted using intra-block copy mode.

15. The method of claim 14, wherein the data provided in the video bitstream includes a parameter that indicates that bi-prediction is disabled.

16. The method of claim 14, wherein the video bitstream further indicates a portion of the encoded video data to which disabling of bi-prediction applies.

17. An apparatus for decoding video data, the apparatus comprising:

a memory configured to store encoded video data received in a video bitstream, wherein the encoded video data includes a plurality of pictures, and wherein the encoded video data is encoded with a plurality of prediction modes, the plurality of prediction modes including an inter-picture uni-prediction mode, an inter-picture bi-prediction mode, and an intra-picture intra-block copy mode; and a processor configured to:

determine, using data provided in the video bitstream, that bi-prediction is disabled as an inter-picture prediction mode for a picture from the plurality of pictures, wherein bi-prediction is disabled in response to intra-block copy mode being enabled for the picture determine, using syntax elements in the video bitstream, that a block from the picture was predicted using intra-block copy mode;

determine, from the syntax elements, a reference block from among previously decoded blocks of the picture, wherein the reference block was not predicted using bi-prediction due to bi-prediction being disabled for the picture; and reconstruct the block from the reference block based on the block having been predicted using intra-block copy mode.

18. The apparatus of claim 17, wherein the data provided in the video bitstream includes a parameter that indicates that bi-prediction is disabled.

19. The apparatus of claim 17, wherein the video bitstream further indicates a portion of the encoded video data to which disabling of bi-prediction applies.

* * * * *